(12) United States Patent
Ward et al.

(10) Patent No.: US 11,316,780 B2
(45) Date of Patent: Apr. 26, 2022

(54) ATTESTATION-BASED ROUTE REFLECTOR

(71) Applicant: Cisco Technology, Inc., San Jose, CA (US)

(72) Inventors: David Delano Ward, Somerset, WI (US); Jakob Heitz, Santa Clara, CA (US); William Michael Hudson, Jr., Cary, NC (US); Eric Voit, Bethesda, MD (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 112 days.

(21) Appl. No.: 16/833,197

(22) Filed: Mar. 27, 2020

(65) Prior Publication Data

US 2021/0306256 A1 Sep. 30, 2021

(51) Int. Cl.
| | |
|---|---|
| *H04L 29/12* | (2006.01) |
| *H04L 9/32* | (2006.01) |
| *H04L 9/06* | (2006.01) |
| *H04L 12/725* | (2013.01) |
| *H04L 12/715* | (2013.01) |
| *H04L 45/302* | (2022.01) |
| *H04L 45/00* | (2022.01) |
| *H04L 101/622* | (2022.01) |

(52) U.S. Cl.
CPC .......... *H04L 45/302* (2013.01); *H04L 9/0643* (2013.01); *H04L 9/3213* (2013.01); *H04L 9/3247* (2013.01); *H04L 45/04* (2013.01); *H04L 61/6022* (2013.01)

(58) Field of Classification Search
CPC .......... H04W 56/0025; H04W 12/003; H04W 76/11; H04L 43/0894; H04L 47/12; H04L 43/0858; H04L 49/102
See application file for complete search history.

(56) References Cited

U.S. PATENT DOCUMENTS

| | | | |
|---|---|---|---|
| 2021/0112059 A1* | 4/2021 | Heldman | .............. H04L 61/103 |
| 2021/0250297 A1* | 8/2021 | Norton | ................ H04L 43/0894 |
| 2021/0258773 A1* | 8/2021 | Henry | .............. H04W 56/0025 |

* cited by examiner

*Primary Examiner* — Iqbal Zaidi
(74) *Attorney, Agent, or Firm* — Polsinelli PC

(57) ABSTRACT

A verifier peer system transmits a request to an application of another peer system to obtain integrity data of the application. In response to the request, the verifier peer system obtains a response that includes kernel secure boot metrics of the other peer system and integrity data of the application and of any application dependencies. If the verifier peer system determines that the response is valid, the verifier peer system evaluates the integrity data and the kernel secure boot metrics against a set of Known Good Values to determine whether the integrity data and the kernel secure boot metrics are valid. If the integrity data and the kernel secure boot metrics are valid, the verifier peer system determines that the other peer system is trustworthy.

19 Claims, 8 Drawing Sheets

ATTESTATION-BASED ROUTE REFLECTOR

TECHNICAL FIELD

The present disclosure generally relates to the field of computer networking, particularly with regard to the use of route reflectors to gather information usable to assess the reliability and trustworthiness of devices operating within a network.

BACKGROUND

In computer networking, network administrators are often concerned with the security of each of the network devices, including routers, through which sensitive information is often exchanged. When such sensitive information is exchanged and accepted, establishing a secure communications channel that relies on credential information (e.g., passwords, etc.) or a public key infrastructure (PM) is generally not sufficient. If any of the network devices are compromised, the sensitive information being exchanged may also be compromised. As a result, such schemes for validating the integrity of these network devices can be insufficient. This becomes even more challenging as these network devices are often administered by multiple infrastructure providers.

These network devices are often used in an autonomous system (AS) to determine a node to which network traffic propagating through the AS should be forwarded. Routers communicate with other routers within the AS to determine the best paths through the AS to reach a destination address. Various protocols may be used including Border Gateway Protocol (BGP), which is used for routing between different autonomous systems, and Internal Border Gateway Protocol (iBGP), which is used for routing between routers in the same AS to external destinations. An Interior Gateway Protocol (IGP) is used for routing inside an AS to internal destinations. If an attacker gains root access to any of these routers via an exploit, traditional protections such as using Transport Layer Security (TLS) and/or Secure Sockets Layer (SSL) protocols for establishing a secure communications channel and using encryption for interfaces will prove ineffectual. Moreover, trustworthiness of a given router operating within a network may degrade from the time of its initial configuration. However, verification checks that rely on active measurements for validation of router processing traffic are generally expensive and often lack adequate accuracy.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
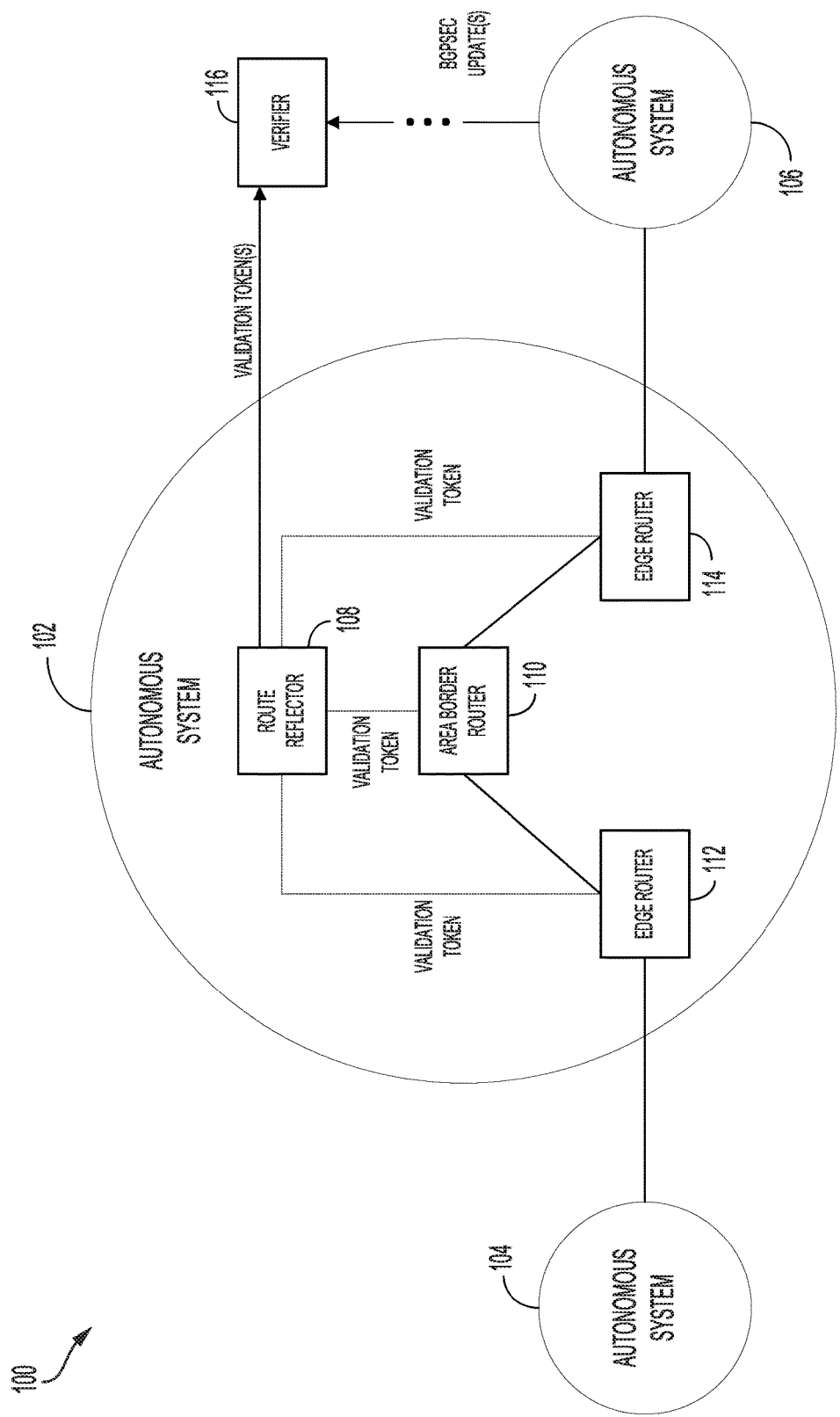
FIG. 1 shows an illustrative example of a networking environment in which a route reflector within an autonomous system gathers validation tokens for routers within the autonomous system to generate a validation token nest in accordance with various implementations.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for assessing the reliability and trustworthiness of devices operating within a network environment with route reflectors.

In an example, a computer-implemented method performed by a route reflector operating within an autonomous system (AS) comprises obtaining, from an autonomous system border router (ASBR) or edge router, an advertised network path within the AS, where the obtained advertised network path comprises a set of digital signatures corresponding to other autonomous systems corresponding to the advertised network path. The computer-implemented method further comprises determining a second network path to egress from the autonomous system, where this second network path corresponds to an ordering of network devices within the AS; obtaining validation tokens for each of these network devices; generating, using these validation tokens and the ordering of the network devices within the AS, a validation token nest; adding, as an attribute within this second network path, a reference to the validation token nest; and advertising this second network path to the network devices in the AS.

In an example, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

Description of Example Embodiments

Figure 7:
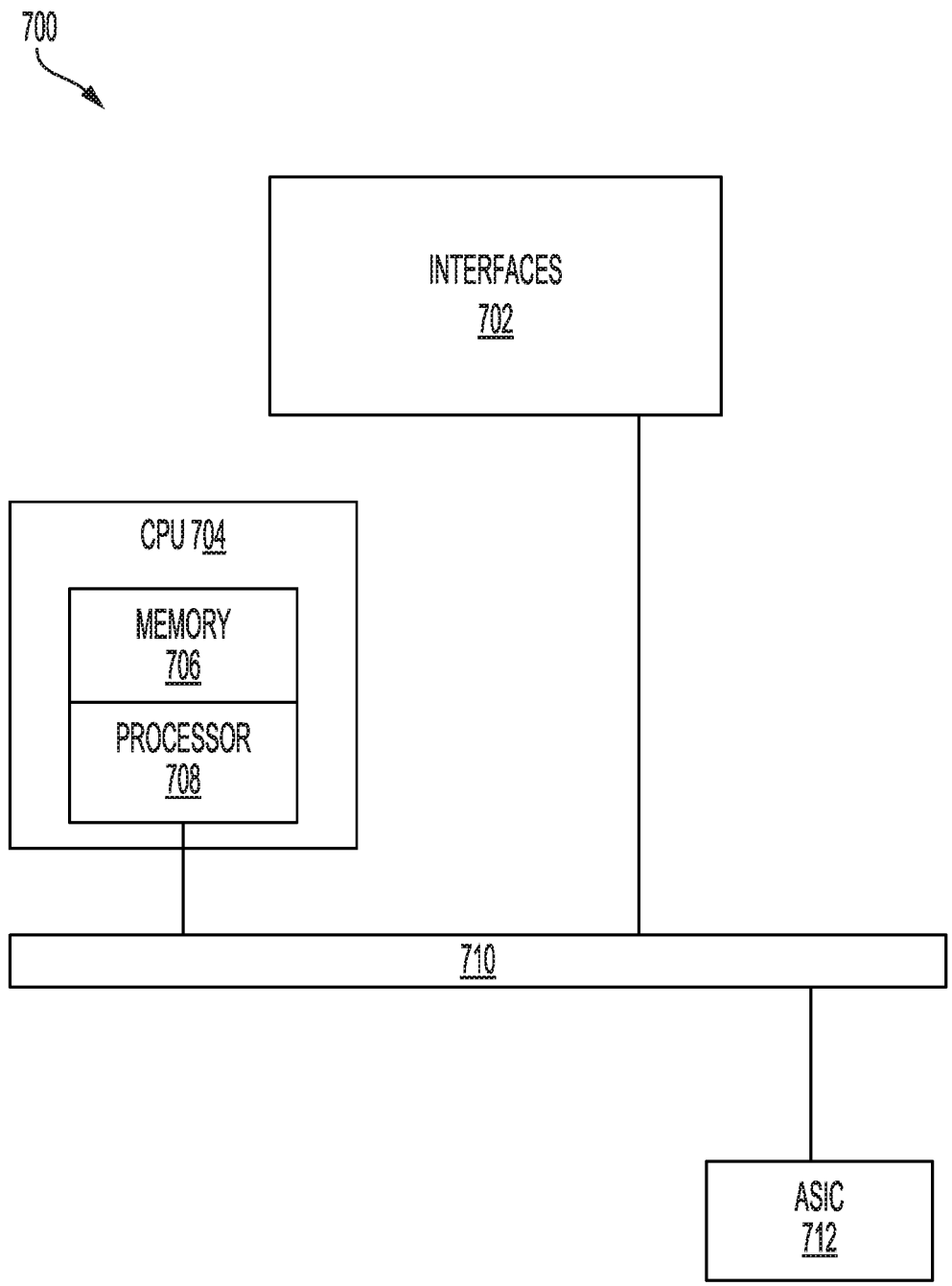
FIG. 7 illustrates an example network device suitable for performing switching, routing, and other networking operations in accordance with some implementations.
Figure 8:
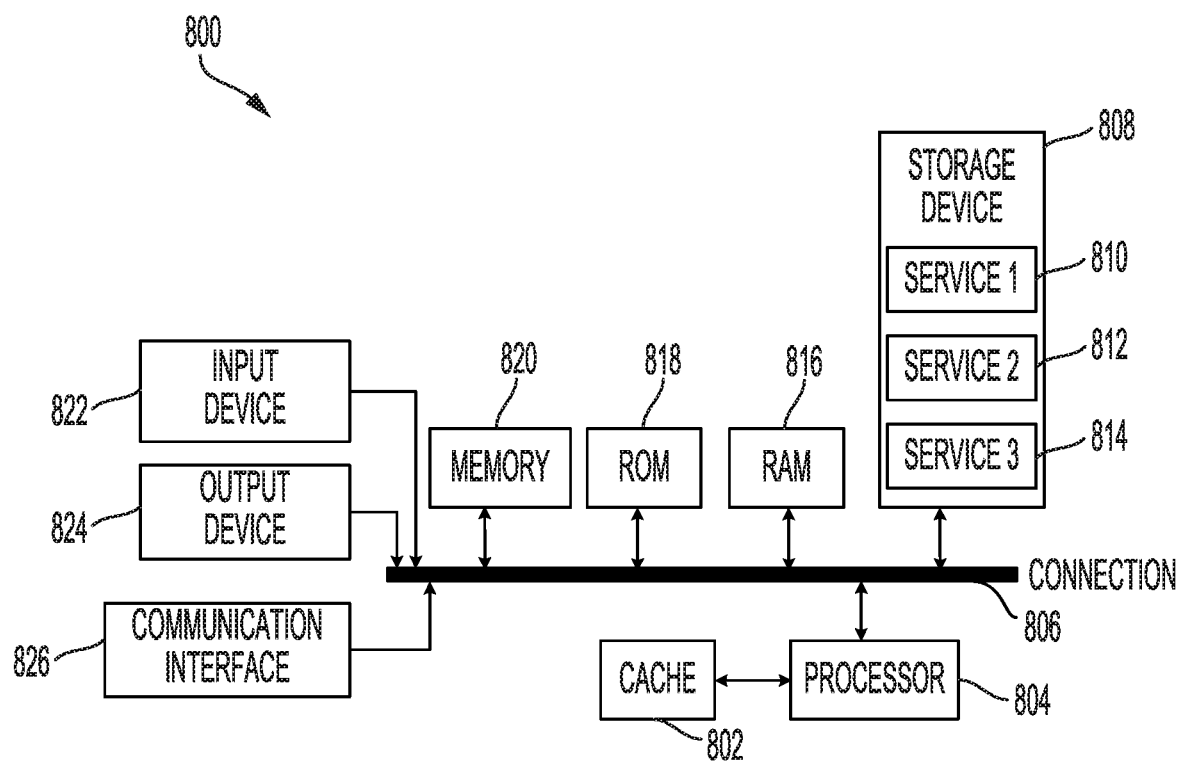
FIG. 8 illustrates a computing system architecture including various components in electrical communication with each other using a connection in accordance with some implementations.

Disclosed herein are systems, methods and computer-readable storage media for implementing a route reflector that obtains and makes available attestation information for validating network devices along a network path within an autonomous system. The present technologies will be described in more detail in the following disclosure as follows. The discussion begins with a detailed description of example systems, processes and environments for providing a route reflector that obtains and makes available attestation information for validating network devices along a network path within an autonomous system, as illustrated in FIGS. 1 through 6, will then follow. The discussion concludes with a description of example network and computing devices, as illustrated in FIGS. 7 and 8.

The disclosure now turns to an initial discussion of example concepts and technologies for providing verifiable proof of integrity of network nodes traversed by packets.

A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc. When data traffic is transmitted through one or more networks, the data traffic typically traverses a number of nodes that route the traffic from a source node to a destination node.

While having numerous nodes can increase network connectivity and performance, it also increases security risks as each node that a packet traverses introduces a risk of unauthorized data access and manipulation. For example, when a packet traverses a node, there is a security risk that is introduced which can result from the node being potentially compromised (e.g., hacked, manipulated, captured, etc.). As a result, compliance, security, and audit procedures can be implemented to verify that network users, devices, entities and their associated network traffic comply with specific business and/or security policies.

When sensitive information is transmitted through nodes in a network, such as in battlefield, banking settings, and healthcare settings, such traffic should be sent through uncompromised nodes to prevent access to, leakage of, or tampering with the data and sensitive information carried by that traffic. If an attacker gains access to a device via some exploit, previous protection and encryption approaches for network interfaces are generally ineffective at mitigating or addressing such unauthorized access and resulting damage.

Proving that network traffic complies with specific policies can involve proving in a secure way that the traffic has traversed a well-defined set of network nodes (e.g., firewalls, switches, routers, etc.) and that such network nodes have not been modified or compromised. This can help ensure that the network nodes have performed their expected or intended actions (e.g., packet processing, security or policy compliance verification, routing, etc.) on the packet and that the packet has traversed the network nodes.

Some security approaches can aim at removing any implied trust in the network used for connecting applications hosted on devices to cloud or enterprise hosted services. Moreover, some security approaches can be implemented to verify the trustworthiness (e.g., the integrity, identity, state, etc.) of the network and/or nodes traversed by packets. In some cases, certain verification checks can be implemented to validate or verify that traffic has traversed a specific set of nodes and that such nodes are trusted and uncompromised. In some examples, certain Proof-of-Transit (POT), Trusted Platform Module (TPM), attestation, or proof of integrity approaches can be implemented to verify or validate the trustworthiness of a node in a network.

POT can enable a network user or entity to verify whether traffic traversed a defined set of network nodes. Attestation, as further described below, can also be used to verify the integrity of a node. In some cases, the approaches herein can integrate both to offer a secure approach that allows network users or entities to verify that traffic has traversed a defined set of nodes and that such nodes have not been compromised.

In some cases, TPM can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that should be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on three Roots of Trust in a trusted platform, including Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer 2 (L2) connected devices and maintain these logs in trusted storage. These logs can be protected by embedding a private key into every trust anchor produced for a hardware device and publishing the device's public key as a certificate to adjacent devices. This peering device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, metadata elements containing security measurements or evidence, can be used to provide verifiable evidence of device trustworthiness (e.g., integrity, state, etc.). The metadata elements can include applicable data for verifying trustworthiness of a device and be provided through an applicable technique for verifying device trustworthiness. For example, the metadata elements can be provided as part of a canary stamp associated with the device. A canary stamp can indicate or otherwise include a signed measurement associated with a device for verifying trustworthiness of the device. In turn, such measurements can be referred to as canary stamps because each signed measurement is like a stamp proving its authenticity, and like a canary in a coal mine that indicates an early sign of trouble. Such verifiable evidence can be appended or included in packets transmitted by nodes on a network. The metadata elements can thus be used to evaluate the trustworthiness of a node(s) and react accordingly. For example, a device or entity can review metadata element associated with a node to determine that the node should not be trusted and adjust a network policy to mitigate possible damage.

In some implementations, dedicated cryptoprocessors, such as a processor in TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through canary stamps, as previously described. However, a receiver of such evidence should be able to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is an arbitrary number that can be used to introduce randomness. In some instances, a nonce can be used just once in a cryptographic communication. Further, a nonce can be passed into a TPM and/or incorporated into a canary stamp/metadata. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may less effective with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy.

Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push, multicast, and broadcast messages.

Various of the foregoing approaches can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, metadata elements, e.g. canary stamps, and tokens can be created by extracting current counters (e.g., clock, reset, restart) from a node's TPM, and incorporating such counters and security measures taken from the node into a packet. In some examples, the current counters and/or security measures can be hashed with information within an external TPM. The metadata elements and tokens can thereby provide a non-spoofable token or metadata element, which can bind continuously incrementing counters on an attestee or attester with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee or attester TPM information which includes these counters can be determined to have occurred subsequent to any previously-received measurement. Also, if the reset and restart counters have not changed, the incremental time since any previous measurement can also be known.

In some cases, a large amount of information that should be trusted by network peers may not be contained within the TPM's Program Configuration Registers (PCR). As a result, indirect methods of validating that a node has not been compromised can be applied.

The receipt of the metadata elements, e.g. canary stamps, and/or tokens can mean that a receiver should have the option of verifying the information. In many cases, such verification can be performed without the need of supplementary evidence being sent with the canary stamp. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example, TPM counters, timestamps, nonces, and/or time tokens. On any discrepancy, a controller or centralized device can isolate a compromised node from its network peers by shutting down the interfaces of the node.

In some examples, the metadata elements, e.g. canary stamps, and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer proof of integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide proof of integrity and proof of transit through uncompromised nodes. In some examples, metadata elements and tokens containing or reflecting security measures are used as previously mentioned to validate the integrity of a node and perform continuous evaluation of node integrity. Thus, the metadata elements and tokens described herein can be used to provide proof of transit through uncompromised nodes.

In some examples, the metadata elements and tokens can be added as additional metadata to packets that traverse a network where proof of transit via uncompromised nodes is desired. Various strategies can be implemented for transporting the metadata elements and tokens in a packet. In some cases, the metadata elements and tokens can be carried within an In-Situ (or in-band) Operations, Administration and Management (IOAM) data field.

In some implementations, the metadata elements and tokens can be carried with IOAM trace data. For example, a canary stamp can be carried as part of an IOAM data field in a variety of encapsulation protocols such as, for example and without limitation, IPv4, IPv6, NSH (Network Service Header), etc. In some cases, the canary stamp can be carried in an IOAM data field as an IOAM Trace option data element (e.g., with an IOAM Trace type for node integrity canary stamp). A metadata element, token, or digest, e.g. canary stamp digest, can be added in the IOAM trace option of a packet by each node that forwards the packet.

When the packet reaches a node (e.g., the destination node and/or an intermediate node) that removes IOAM metadata (e.g., an IOAM decapsulating node), the validity of the metadata element and/or token in the packet can be verified to determine that the packet traversed uncompromised nodes. In some examples, since canary stamps are time bound, the packet trace timestamps defined in IOAM can be used to validate the canary stamp in the time window the packet traversed that node.

Verification can be performed without placing a large transactional load on the verifier or a device, such as a controller, that will ultimately validate the security measurements associated with the metadata elements or tokens. This is because the measurement values can often change infrequently. The verifier may only need to validate a metadata element and/or token carried within an IOAM data trace whenever the associated security measurements associated change (e.g., a verifier may only need to check with a controller whenever it sees a node's TPM extends a PCR value which was not previously confirmed by the verifier).

In some cases, when only the time ticks within a signed metadata element increases, only the signature of the metadata element is validated. To do this, the verifier may use the public key of any node which can place a metadata element. Such signature validation can be done without using a controller to verify the measurements.

In another example, a packet can carry IOAM POT data with space optimization of metadata element values, e.g. canary stamp values. For example, a new IOAM POT data field can carry a canary stamp or a hash extend of a canary stamp and, in turn, canary stamp data can be carried across nodes. In some cases, a canary stamp hash extend can be a similar method as PCR extend operation performed by TPMs.

In some cases, the canary stamp hash can provide a one-way hash so that a canary stamp recorded by any node cannot be removed or modified without detection. IOAM proof of transit option data for a canary stamp digest can be defined by a hash algorithm (e.g., 20 octets with SHA1, 32 octets with SHA 256, etc.). In some implementations, each node along a path of the packet can forward the packet with a new or updated canary stamp digest. In some examples, the new or updated canary stamp digest can be generated by a node as follows: IOAM canary stamp digest new value=Digest of (IOAM canary stamp digest old value||hash (canary stamp of the node)), where the IOAM canary stamp digest old value can refer to the canary stamp digest included in the packet by one or more previous hops.

Moreover, in some cases, a Per Packet Nonce (PPN), where PPN changes per packet and is carried as another field within the IOAM metadata option, can be added to provide robustness against replay attacks. To illustrate, in some examples, a PPN can be added as follows: IOAM canary stamp digest new value=Digest of (IOAM canary stamp digest old value||hash(canary stamp of the node||PPN)). A node creating the new value for the IOAM canary stamp digest can thus take the value of any previous IOAM canary stamp digest and extend/hash that value with the node's current canary stamp. The result of the concatenation and hashing can then be written into IOAM POT data (or other IOAM data fields) as the new IOAM canary stamp digest.

At the verifier (e.g., the device verifying the canary stamp data), the same operation can be performed over expected canary stamp values calculated for the nodes that are traversed in the time window when the packet was forwarded. A verifier can be an inline device or a centralized device. Moreover, in some examples, nodes that are expected to be traversed can be identified using IOAM tracing, routing state or by sending active probes. A match between the value of POT data carrying specific metadata elements, e.g. a canary stamp digest and the expected canary stamp value, can prove that the packet traversed through trusted or uncompromised nodes.

In some examples, one or more strategies can be implemented to optimize metadata element validation. For example, metadata elements, e.g. canary stamps, can detect attempts of a replay attack by embedding a nonce as well as TPM or TPM2 counters (e.g., clock, reset, restart). In some cases, this nonce can be part of the metadata elements and different from the PPN described above.

The nonce is relevant to a receiver as the interval from the nonce's creation time to the first stamp received by the verifier can define the interval of freshness (e.g., the measurement is no older than this interval of freshness). From there, the TPM2 time ticks counter can be used to maintain that initial gap of freshness even without the delivery of a new nonce.

In some implementations, to optimize metadata element or token validation across nodes, the following approaches can be implemented to deliver synchronization information from a central component to each node and the verifier. For example, a central server can broadcast or multicast centralized nonce values (e.g., tracked random numbers). Each node can pick up the latest nonce and use it to attest a value. A verifier can know the freshness of a metadata element or token it receives from each node. This freshness can be the delta in time since that particular nonce was issued. Subsequent attestations can use the incrementing time ticks to prove freshness from that initial time gap. In some cases, the issuing of new nonces can reset the time gap to a potentially shorter interval.

Moreover, in some cases, each node can embed attested time within its metadata element. To get attested time, a TUDA (Time-Based Uni-Directional Attestation) scheme such as the TUDA scheme described in https://tools.ietf.org/id/draft-birkholz-i2nsf-tuda-01.html, the contents of which are incorporated herein by reference in their entirety, can be used. This can result in the availability of both the attested time at a node, as well as the value of the TPM2 counters at this node when a TUDA time-synchronization token was created. This can eliminate the use of a central nonce authority, but can increase the size of the metadata element as the nonce can be replaced by the TUDA time-synchronization token. This approach may also implement a central timestamp authority as per TUDA. In some examples, for each hop, a canary stamp digest value can be: IOAM canary stamp digest new value=Digest of (IOAM canary stamp digest old value||hash(canary stamp of the node||TUDA time-synchronization token of the node)).

This approach can provide numerous benefits. For example and without limitation, with this approach, a verifier can limit the number of verifications by verifying the signature of a hop's time-synchronization token only when it changes. Moreover, with this approach, there may not be a time gap nonce changeover freshness when a first measurement is received. Further, in some cases, this approach can be implemented without also carrying a PPN or without synchronizing a nonce across nodes as previously described.

Further, an attester, e.g. a node or a verifier, can use random numbers, otherwise pseudo-random numbers, created by peers and/or the attester to generate and verify attestation information. Specifically, the attester can accumulate random numbers from one or more layer 2 peers. The random numbers can be accumulated from the peers over a specific amount of time, e.g. a short duration of time. In turn, the random numbers can be combined into a number through an applicable technique, e.g. a Bloom filter. This number can serve as a nonce for a cryptoprocessor for generating a result. As follows, the layer 2 peers, potentially including the attester, can use the result created by the cryptoprocessor, to verify/validate that their corresponding provided random number was used in generating the nonce ultimately used by the cryptoprocessor to create the result. In turn, the layer 2 peers, potentially including the attester, can generate verified attestation information based on the random numbers generated by the peers, the nonce created from the random numbers, and/or the result created by the cryptoprocessor from the nonce.

Having provided an initial discussion of example concepts and technologies for providing explicit verifiable proof of integrity of network nodes traversed by packets, the disclosure now turns to FIG. 1.

FIG. 1 shows an illustrative example of a networking environment 100 in which a route reflector 108 within an AS 102 gathers validation tokens for routers 110, 112, 114 within the AS 102 to generate a validation token nest in accordance with various implementations. The networking environment 100 represents a series of nodes of interconnected communication paths for receiving and transmitting data packets that propagate through the network. An autonomous system, such as AS 102, is a collection of connected IP routing prefixes under the control of a set of operators on behalf of an administrative domain. Networking environment 100 offers a communicative interface between nodes, and may include any LAN, WLAN, MAN, Intranet, Extranet, WAN such as the Internet, cloud network, VPN, or any other appropriate architecture or system that facilitates communications in the network environment. Additionally, networking environment 100 may implement a User Datagram Protocol/Internet Protocol (UDP/IP) connection and use Transmission Control Protocol/Internet Protocol (TCP/IP) in particular instances. Alternatively, any other suitable communication protocol for transmitting and receiving data packets within networking environment 100 may be implemented.

In the AS 102, route reflector 108, area border router 110, and edge routers 112, 114 are interconnected via a set of communication links. Edge router 112 may be interconnected with a router within AS 104 via a communication link, while edge router 114 may be interconnected with a router within AS 106 via another communication link. The autonomous systems 102-106 may be configured as distinct routing domains. One or more of the routers 110-114 within the AS 102 can provide inter-domain routing for electronic data between various end nodes in the AS 102. These end nodes may include devices used to initiate a communication in the networking environment 100, such as desktop computers, laptop computers, servers, appliances, mobile computing devices, or any other device, component, element, or object capable of initiating voice, audio, video, media, or data exchanges within the networking environment 100. These end nodes may further include any device that is configured to initiate communication on behalf of another entity or element, such as a program, database, or any other component, device, element, or object capable of initiating an exchange within the networking environment 100.

While the route reflector 108 is illustrated as being within the AS 102, the route reflector 108 may be provisioned in a cloud network as a cloud-based route reflector. This cloud network may be physically remote from AS 102 and may be accessible over the Internet or any other WAN. However, the route reflector 108 may be part of the same routing domain as AS 102. Thus, the route reflector 108 cooperates with the routers 110-114 to allow for route reflection within the AS 102. It should also be noted that FIG. 1 is a representation of possible elements of a networking environment. Thus, any number of communication links, routers, and autonomous systems may be configured in a networking environment.

For purposes of illustrating certain embodiments disclosed herein, understanding the communications that may be traversing the networking environment 100 and the protocols used therein in effecting such communications is important. Thus, the following information may be viewed as a basis from which the present disclosure may be properly explained.

Various routing protocols may be implemented in networking environment 100 to enable appropriate routing among the autonomous systems 102-106. BGP is an example routing protocol that enables inter-domain routing between autonomous systems. An external BGP (eBGP) session provides routing information for routes inside an AS to external destinations. BGP is defined in Request for Comments (RFC) 4271 (https://tools.ietforg/html/rfc4271), which is hereby incorporated in its entirety into this disclosure by reference.

A BGP session can be established when BGP neighbor routers establish a network connection in order to communicate in accordance with the protocol. This connection is typically established using a connection-oriented protocol such as TCP, which ensures delivery of messages between the connected neighbor routers. The connected neighbor routers can communicate using BGP to exchange update messages that include routing information. Update messages are used to update information included in a routing information base (RIB) or the receiving neighbor router. An update message can announce a new route or withdraw a previously advertised route. Update messages can include various fields such as network layer reachability information (NLRI). NLRI may include IP address prefixes of feasible routes being advertised in the update message. Conversely, a field for withdrawn routes may include IP address prefixes for routes being withdrawn because they are no longer reachable. A route is a unit of information that pairs a set of destinations with attributes of a path to those destinations. A path can be defined by one or more attributes and is generally intended to be defined as the route between two points in a network, such as an AS. IP addresses taken from an IPv4 or IPv6 pool can be divided into two parts including a network section and a host section. The network section identifies a set of destinations and is referred to as the prefix. A prefix in a destination address is used by a routing protocol to render a routing decision for the next hop in the path. A prefix may also be referred to as a "routing prefix."

An AS can use iBGP to advertise reachability information for network address prefixes of destinations (e.g., routers) outside the AS. To implement iBGP, however, a full mesh is required in which every router within the AS is connected to every other router via a connection, such as TCP. This full mesh requirement can severely limit scalability of an AS running iBGP sessions.

In BGP networks, route reflection is often desirable because a full mesh implementation can be avoided. Route reflector deployments can result in a significant reduction of the number of iBGP sessions needed in the network. Route reflection is described in greater detail in RFC 4456 (https://tools.ietf.org/html/rfc4456), which is hereby incorporated in its entirety into this disclosure by reference.

A route reflector is a network element used in a BGP network to implement route reflection. In a BGP route reflection deployment, one or more routers are designated as route reflectors and are allowed to accept and propagate iBGP routes to their clients. The designated route reflectors can be fully meshed with iBGP peering sessions between the route reflectors. Each route reflector can peer with multiple routers, which may be referred to herein as route reflector clients. In some implementations, the clients of each route reflector form a cluster of routers to which the route reflector is connected. A cluster of routers can be connected via iBGP through their shared route reflector. A route reflector can propagate the routing information for its client routers to other route reflectors. Thus, the number of sessions needed in a BGP network can be greatly reduced.

In hot potato routing, a route reflector attempts to render a best path routing decision that directs network traffic to an AS egress point, within a given BGP network, that is closest to the router rendering the decision. Typically, a route reflector selects the best path based on an interior gateway protocol (IGP) metric computed from its IGP database and advertises this path to its client BGP speakers. A metric is the quantitative value used to measure the distance to a given network. For hot potato routing, the best path to a network is the path with the lowest metric.

A route reflector may be embodied as any type of router, including a border or edge router deployed on the perimeter of an AS or as a distributed router in a cloud network, for example. Although route reflectors are usually located in the forwarding path within a cluster (e.g., at the point of presence (POP) boundaries) and stay congruent with the actual topology of the network, virtual route reflectors and possibly other route reflectors may be placed outside of clusters. For example, ring topologies make it difficult to form route reflector clusters naturally, and tunneled applications, such as Layer 3 Virtual Private Networks (L3VPNs), do not necessarily need route reflectors to be in the forwarding path. Additionally, distributed route reflectors may serve as path aggregation points on the network in order to reduce distribution of BGP information to edge routers that may have limited CPU and memory.

In the embodiment(s) illustrated in FIG. 1, edge routers 112, 114 and area border router 110 each establish a BGP session (e.g., TCP connection) with route reflector 108 to communicate in accordance with the protocol. In BGP sessions, edge routers 112, 114 can provide update messages to route reflector 108 to advertise NLRI. NLRI advertised by edge router 112, for example, can include IP prefixes of network addresses to which edge router 112 can route network traffic it receives, such as network traffic from AS 104. Other interior routers within the AS 102 may also establish BGP sessions with route reflector 108 and send BGP update messages. These interior routers, however, may not advertise reachability to any external destinations, such as AS 104 or AS 106. In some scenarios, multiple edge routers can advertise routes for the same prefix. In this scenario, route reflector 108 can see multiple paths to the prefix.

In an embodiment, for each network address prefix, route reflector 108 selects a best path through the AS 102 to an egress point. The route reflector 108 can advertise the best path to the edge routers 112, 114 and the area border router 110 within the AS 102. These routers receiving the advertisement can use the best path information to route network traffic toward external destinations (e.g., other autonomous systems, such as AS 106, or an end point, such as verifier 116). For example, a best path selected for the routers in AS 102 to reach network address prefix 1.1.1.1/24 can be advertised by route reflector 108 in BGP sessions established with edge routers 112, 114 and area border router 110. These routers can use the best path information to route network traffic toward external destinations associated with the 1.1.1.1/24 network address prefix.

In an embodiment, the edge routers 112, 114 represent autonomous system border routers (ASBRs), customer edge routers (CEs), provider edge routers (PEs), and any other node provisioned at an edge, or perimeter, of the AS 102 that can participate in BGP sessions with route reflector 108. The area border router 110 can represent a router located near a border of one or more areas of an IGP. IGPs are routing protocols for exchanging routing information between routers within an AS for internal destinations. Examples of IGP include OSPF and ISIS. The routers in AS 102 may form an IGP domain (e.g., an area for OSPF or a level for ISIS). Generally, an area/level of an IGP is a routing group of an AS that can be smaller than the AS. In some embodiments, IGP routing groups correspond to clusters within the AS 102. In other implementations, however, clusters may not have a one-to-one correspondence with routing groups. Area border router 110, for example, can provide an ingress and egress point for network traffic flowing to nodes within the routing group or flowing from the routing group to nodes in other routing groups within the AS 102. In some implementations, however, IGP may have a single flat area.

IGP neighbors (two routers with a common link) may form an adjacency to exchange routing protocol packets. A routing protocol packet communicated by a router can specify the router's local routing topology including, for example, a router ID, the router's IP address, links to other routers within the router's area, and route metrics for each of the links. Link state advertisements (LSAs) and link state packets (LSPs) are routing protocol packets that are used to communicate in OSPF and ISIS, respectively. For ease of illustration, embodiments described herein generally refer to LSAs and areas, which are used in OSPF. It will be apparent, however, that the embodiments disclosed herein can be applied to any other suitable IGPs including, but not limited to, ISIS. In ISIS, routing protocol packets are referred to LSPs, and routing groups are referred to as levels.

While IGP neighbors form an adjacency to exchange routing protocol packets, there may be intermediate devices connecting these IGP neighbors. For example, rather than a physical cable separating IGP neighbors, one or more intermediate devices may provide connectivity between these IGP neighbors. To obviate the need to have these intermediate devices identified and attested, the IGP neighbors may establish a MACsec session between them. This MACsec session may prevent security threats, such as passive wiretapping, intrusion, man-in-the-middle (MitM) attacks, playback attacks, and the like. Further, the MACsec session may prevent any of these intermediate devices from snooping or altering the network traffic between the IGP neighbors. Network traffic transmitted over a MACsec session is encrypted and decrypted using a cipher suite agreed upon by the IGP neighbors. It should be noted that while MACsec is used throughout the present disclosure for the purpose of illustration, other cryptographic communication standards may be used (e.g., IPsec, etc.).

In an IGP, each router has its own unique router ID. By way of example, OSPF can set a router ID by configuring an IP address on a loopback interface of the router. In ISIS, the router ID (or system ID) can be configured by an administrator in various suitable ways (e.g., IP address of loopback interface, MAC address, sequential numbering, etc.).

In an embodiment, the edge routers 112, 114 each provide, to the route reflector 108, BGP update messages advertising NLRI comprising IP prefixes of network addresses to which edge router 112 can route network traffic. The BGP update messages each include a BGP Security (BGPsec) path attribute. BGPSec is defined and further described in RFC 8205 (https://tools.ietf.org/html/rfc8205), which is hereby incorporated in its entirety into this disclosure by reference. The BGPSec path attribute may be used to verify that the route was sent along an AS-path stated in the route. For instance, each AS in the AS-path can add a digitally signed attestation that it sent the route to the next AS in the AS-path. Thus, the BGPSec path attribute may be a sequence of such digital signatures, whereby each digital signature corresponds to an AS in the AS-path. In some instances, digital signatures for one or more autonomous systems in the AS-path may not be available. This may indicate a lack of trustworthiness for the particular AS, as attestation information for the particular AS may not be available and, thus, cannot be validated by a verifying entity. Each digital signature, in an embodiment, is compliant with the Resource Public Key Infrastructure (RPM). RPM is a cryptographic method of digitally signing records that associate a BGP route advertisement with the correct originating AS in the AS-path. RPM is defined and further described in RFC 6480 (https://tools.ietforg/html/rfc6480), which is hereby incorporated in its entirety into this disclosure by reference.

In an embodiment, the route reflector 108 obtains, from one or more BGP speakers within the AS, BGP link state information that may be used to generate validation tokens for each of the network devices (e.g., routers) within the AS 102. The BGP link state information may be provided via a BGP-LS attribute. The BGP-LS attribute is a non-transitive BGP attribute that is used to carry link, node, and prefix parameters and attributes. This attribute is defined as a set of TLV triplets and is included with Link-State NLRIs. The BGP-LS attribute is defined and described in further detail in RFC 7752 (https://tools.ietf.org/html/rfc7752), which is hereby incorporated in its entirety into this disclosure by reference.

To provide the information required by the route reflector 108 to generate the validation tokens for each of the network devices within the AS 102, new TLVs are added to transport the forwarding tables of each of these network devices. In an embodiment, the new TLVs include sub-TLVs, which are used to add information corresponding to any MACsec associations among IGP neighbors within AS 102. In some embodiments, the route reflector 108 uses NETCONF and/or YANG to gather the information to be used to generate the validation tokens for each of the network devices within the AS 102.

In an embodiment, the link state information for a particular network device includes an attestation that the network device is connected to the network device before it in the path sequence and that the next hop for the network device is the next network device in the path sequence and that the network device is connected to this next network device. This attestation may include the information corresponding to the MACsec associations corresponding to the connection between the network device and the previous network device in the path sequence and the connection between the network device and the next network device in the path sequence.

In an embodiment, the route reflector 108 transmits a request to each router 112-116 of the AS 102 to obtain the integrity data for each of these routers 112-116, which can be used to determine their trustworthiness. The request can include a nonce provided by a manufacturer of each of the routers 112-116. The link state information provided by the BGP speakers may include responses to the request from each of the routers 112-116. For instance, the link state information may include the integrity data and the nonce. The response may also include a hash of the integrity data and the nonce, which the route reflector 108 can use to determine the trustworthiness of the corresponding router. For instance, the route reflector 108 may use a set of Known Good Values (KGVs) of the integrity data and the nonce to compute an expected hash value. The route reflector 108 may compare this expected hash value to the hash value provided in the link state information to determine if there is a match. If there is a mismatch, the route reflector 108 may determine that the corresponding router cannot be trusted. Alternatively, if there is a match, the route reflector 108 may determine that the corresponding router is trustworthy.

In an embodiment, the route reflector 108 can use a passport model to perform real-time validation of integrity data of the various routers in a path sequence. For instance, any resetting of the TPM counters is visible in any subsequent TPM queries. Any restarting of a platform is exposed in subsequent TPM queries. Within these bounds of reset and restart, the TPM's timeticks counter continuously increments. Therefore, any push of attester TPM information which includes these counters is known to have occurred subsequent to any previously-received measurement. Further, if the reset and restart counters have not changed, the incremental time since any previous measurement is also known. Thus, using these timeticks, the route reflector 108 may determine whether provided integrity data is fresh without requiring additional nonces or other responses to challenges from the route reflector 108.

In an embodiment, using the forwarding tables of each of the routers 112-116 within the AS 102, the route reflector 108 can calculate a best path for routing network traffic through the AS 102 from ingress to egress, as described above. Further, the route reflector 108 can construct a validation token nest corresponding to the best path calculated by the route reflector 108. This validation token nest is a merkle tree comprising hash values of the various validation tokens of the routers within the AS 102 organized in an ordering corresponding to the path sequence within the AS 102 from ingress to egress of the best path. The route reflector 108 may store the validation token nest within a validation token repository, where the validation token nest may be associated with an identifier that may be used in a query to obtain the validation token nest. The validation token repository may be maintained by the route reflector 108 within the AS 102. Alternatively, the validation token repository may be maintained in a remote location accessible by the route reflector 108, the other routers of the AS 102, and/or other entities, such as verifier 116, that may wish to obtain the validation token nest to determine the trustworthiness of each of the routers along the best path advertised by the route reflector 108.

In an embodiment, the route reflector 108 inserts, into a BGP update message, a reference to the validation token nest. This reference may be incorporated into the BGP update message within the BGPsec path attribute such that an entity obtaining the BGP update message, such as a verifier 116, may identify the validation token nest corresponding to the path advertised via the BGP update message. In some embodiments, the reference includes an identifier of the validation token nest. Additionally, the reference may include a network address or other information that may be used to access a storage location for the validation token nest and the corresponding validation tokens.

In an embodiment, any network device (e.g., area border router 110, edge routers 112, 114, network devices within other autonomous systems, verifier 116, etc.) obtaining the BGP update message from the route reflector 108 can access the validation token nest to determine the trustworthiness of each of the network devices along the advertised path. For instance, a verifier 116 may obtain the validation token nest from the specified storage location and identify, from the validation token nest, the validation tokens of each of the network devices traversed as part of the advertised path. The verifier 116 may evaluate each validation token against the KGVs for the corresponding network devices to determine whether these network devices are trustworthy. If any of the network devices along the advertised path cannot be trusted, the verifier 116 may perform any mitigating actions to address this issue. For instance, the verifier 116 may cause the route reflector 108 to remove the untrusted network device from any best path calculations. Additionally, or alternatively, the verifier 116 may transmit a notification to an administrator of the network to indicate that this network device cannot be trusted based on its evaluation of the validation token. This may cause the administrator to identify the source of untrustworthiness and address this issue.

The verifier 116 can include any network device or other device that may obtain the BGP update message from the route reflector 108 or other entity within the networking environment 100. For instance, the verifier 116 may be a router operating within another autonomous system. Alternatively, the verifier 116 may be an end node corresponding to the destination IP address specified in the BGP update message. It should be noted that while the verifier 116 is illustrated as being separated from AS 102, the verifier 116 can also include any of the edge routers 112, 114, the area border router 110, or any other network device within AS 102. Thus, any network device that obtains the BGP update message can validate the trustworthiness of any of the other network devices along the advertised path.

Figure 2:
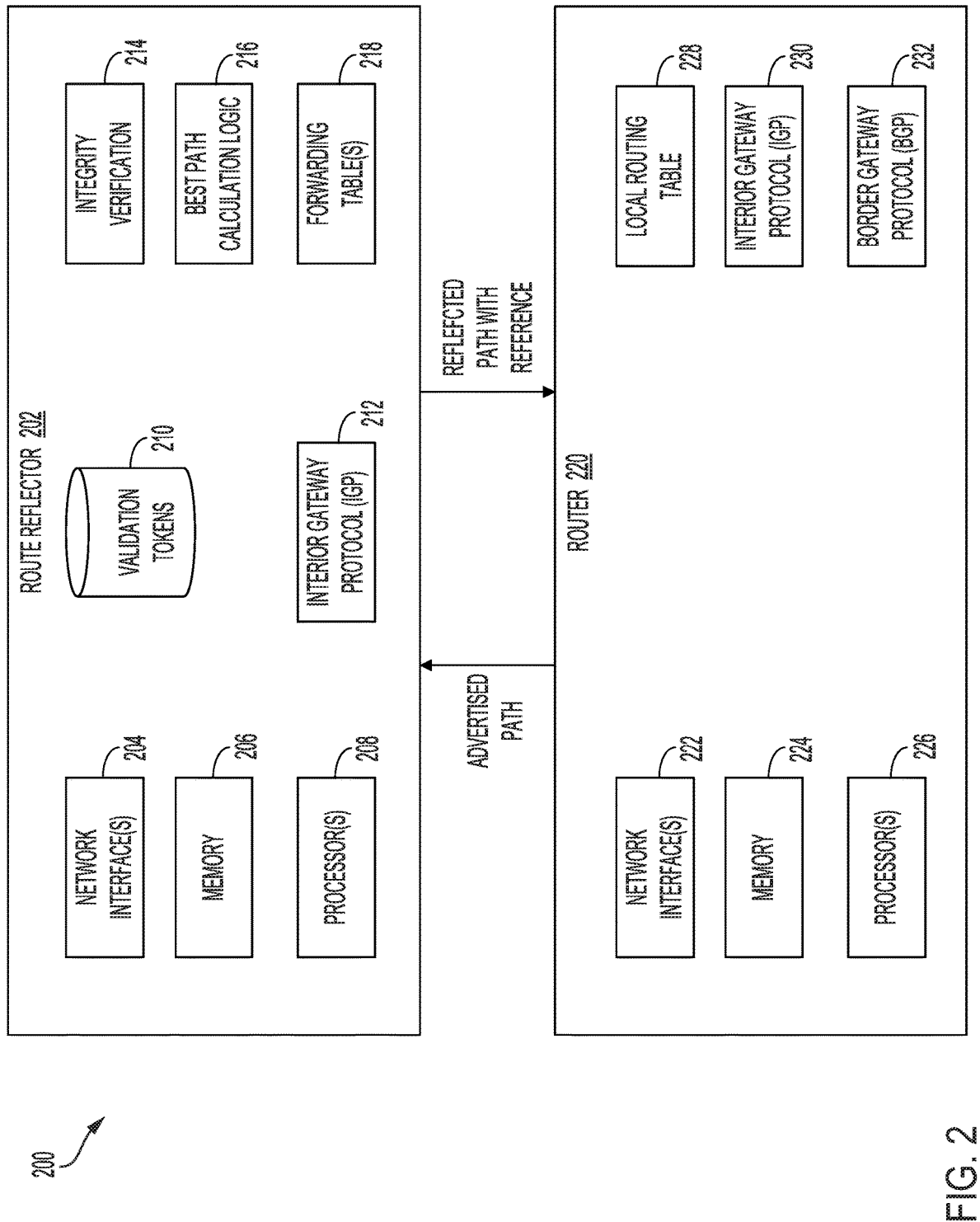
FIG. 2 shows an illustrative example of a networking environment in which a route reflector advertises a path via a BGP update message including an attribute corresponding to a validation token nest in accordance with various implementations.

FIG. 2 shows an illustrative example of a networking environment 200 in which a route reflector 202 advertises a path via a BGP update message including an attribute corresponding to a validation token nest in accordance with various implementations. The route reflector 202 and the router 220 that may obtain a BGP update message from the route reflector 202 may include, respectively, multiple network interfaces 204 and 222, at least one memory element 206 and 224, and at least one processor 208 and 226. Processors 208 and 226 may be operatively coupled to respective network interfaces 204 and 222, which include suitable transmitting and receiving components for communicating over the communication links in the networking environment 200. Further, the route reflector 202 and/or the router 220 may be implemented in physical or virtualized environments or a suitable combination thereof.

Routing protocols can be implemented in route reflector 202 and router 220 to achieve best path determinations or other path determinations for transmitting network traffic from an ingress point of an autonomous system to an egress point of the autonomous system. For instance, the route reflector 202 may utilize BGP Optimal Route Reflection (BGP-ORR) with best path calculation logic 216 to select the best path for the network devices within its autonomous system. The router 220 may rely on BGP 232. Further, IGP 212 and 230 can be implemented in route reflector 202 and router 220, respectively. BGP communications may be transmitted and received between the route reflector 202 and the router 220 via a transmission protocol such as TCP/IP. In at least one embodiment, the best path calculation logic 216 is used to compute best paths through an autonomous system to reach external destinations such as other autonomous systems. A network connection can be established between the router 220 and the route reflector 202 to communicate using BGP and exchange routing information that be used to route data from internal network devices within the AS to external destinations.

Data associated with embodiments described herein may be stored in memory elements 206 and 224 of the route reflector 202 and router 220, respectively, in at least one embodiment. The route reflector 202 may include, but is not limited to, a set of forwarding tables 218. The set of forwarding tables 218 can include IGP metrics (e.g., cost) for each BGP next hop, which can be measured from designated network devices, such as root devices. Further, the set of forwarding tables 218 may include reachability information for network address prefixes advertised by the routers of the autonomous system, including router 220. In one embodiment, the set of forwarding tables 218 is implemented as a RIB table, which can include routing information for all routing protocols used within the networking environment 200.

In the router 220, stored data may include a local routing table 228 that includes routing information to allow the router 220 to route network traffic within the AS and to external destinations. The local routing table 228 may include best path information for network address prefixes, after the best paths are selected and advertised by the route reflector 202. The contents of the local routing table 228 can depend, at least in part, on its location within the AS. For instance, routing information may vary based on whether the router 220 serves as an edge router or area border router within the AS. A best path for a particular prefix stored in a router may vary with respect to a best path for the same prefix stored in another router.

In an embodiment, the route reflector 202 maintains an integrity verification component 214, which is used to validate the integrity data of the routers (e.g., router 220) connected to the route reflector 202 from which the route reflector 202 may obtain routing tables and/or advertised paths that may be reflected to the routers in the AS. As noted above, the route reflector 202 may gather, using BGP-LS, the link state information for the various routers within the AS. The TLVs of the BGP-LS information obtained by the route reflector 202 may be used to transport the forwarding tables of each of the routers within the AS. Further, sub-TLVs may be used to transport the various MACsec associations among the various routers in the AS. The BGP-LS information for a particular router 220 may further include the integrity data for the router 220. In an embodiment, the route reflector 202, via the integrity verification component 214, transmits a request to each network device in the AS (e.g., router 220, etc.), to obtain this integrity data. The request may include a nonce that may be used to prevent replay attacks. The BGP-LS information for the router 220 may thus include a hash generated using the integrity data and the nonce. In a passport model, the hash may further be generated using timeticks, which may be used by the integrity verification component 214 to determine whether the provided integrity data is fresh. Thus, subsequent responses provided with the BGP-LS information need not require use of a nonce.

In an embodiment, the integrity verification component 214 evaluates the integrity data provided by a router 220 against KGVs for the router 220 to determine whether the router 220 is trustworthy. If the integrity verification component 214 determines, based on this evaluation, that the router 220 is trustworthy, the integrity verification component 214 may generate a validation token for the router 220 that may be used by an entity obtaining a BGP update message to validate the router 220 as being trustworthy. However, if the integrity verification component 214 determines that a trustworthiness determination cannot be made for the router 220, the integrity verification component 214 may indicate, as part of the validation token nest, that this particular router 220 in the advertised path cannot be validated for trustworthiness. In some embodiments, rather than determining the trustworthiness of each router 220, the integrity verification component 214 generates the validation tokens for each of these routers using the provided integrity data and the validation token nest corresponding to the best path and comprising the validation tokens in an ordering corresponding to the order in which routers within the AS are traversed to reach the egress point.

In an embodiment, the integrity verification component 214 utilizes the best path calculation logic 216 to generate the validation token nest for the AS. For instance, the integrity verification component 214 may identify, from the best path calculation logic 216, the best path to be traversed through the AS to reach an egress point. The integrity verification component 214 may identify the routers along this best path and obtain the integrity data for each of these routers to perform the evaluation described above. Based on the ordering of routers along this identified best path, the integrity verification component 214 may generate the validation token nest for the best path, for which a reference may be included in the BGP update message to be pushed to the routers of the AS to advertise this best path. The validation tokens and the validation token nest generated by the integrity verification component 214 may be stored within a validation token repository 210 of the route reflector 202. It should be noted that while the validation token repository 210 is illustrated as being maintained within the route reflector 202, the validation token repository 210 may include external storage locations accessible by the route reflector 202 for storage of these tokens and nests.

Figure 3:
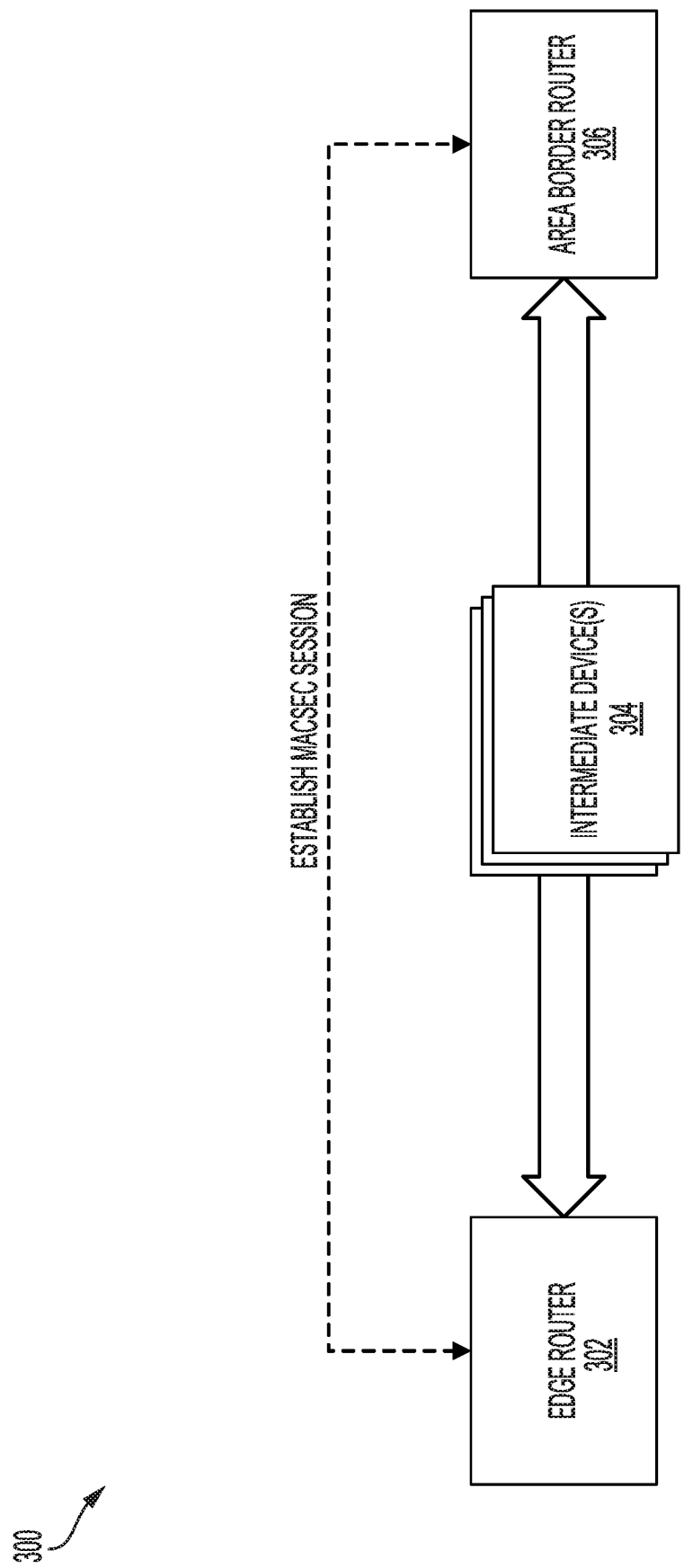
FIG. 3 shows an illustrative example of a networking environment in which a Media Access Control Security (MACsec) session is established between a set of routers verifiably connected to one another in accordance with various implementations.

FIG. 3 shows an illustrative example of a networking environment 300 in which a MACsec session is established between a set of routers verifiably connected to one another in accordance with various implementations. In the networking environment 300, an edge router 302 and an area border router 306 within an autonomous system are IGP neighbors sharing a common link. These IGP neighbors may form an adjacency to exchange routing protocol packets, whereby these IGP neighbors may use OSPF, ISIS, or any other appropriate IGP. These packets can specify a router's local routing topology.

In various instances, there may be intermediate devices 304 connecting these IGP neighbors (e.g., edge router 302 and area border 306). For example, rather than a physical cable separating the edge router 302 and the area border router 306 within the AS, one or more intermediate devices 304 may provide connectivity between these IGP neighbors. To prevent security threats, such as passive wiretapping, intrusion, man-in-the-middle (MitM) attacks, playback attacks, and the like, the edge router 302 and the area border router 306 may establish a MACsec session. This MACsec session may prevent any of these intermediate devices 304 from snooping or altering the network traffic between the edge router 302 and the area border router 306. Network traffic transmitted over a MACsec session is encrypted and decrypted using a cipher suite agreed upon by the edge router 302 and the area border router 306.

As noted above, BGP speakers within the AS may transmit BGP-LS information to the route reflector, which can be used by the route reflector to generate the validation tokens for the various network devices within the AS. The BGP-LS information may include TLVs that include the forwarding tables for the network devices of the AS, including edge router 302 and area border router 306. Additionally, sub-TLVs added to these TLVs may be used to add references to the MACsec sessions established among the network devices within the AS, including the MACsec session established between the edge router 302 and the area border router 306. These references may be incorporated into the validation tokens for each of the network devices of the AS to allow a verifier to verify that a network device is connected to the network device before it in the path sequence advertised by the route reflector and to the network device that serves as the next hop for the path.

Figure 4:
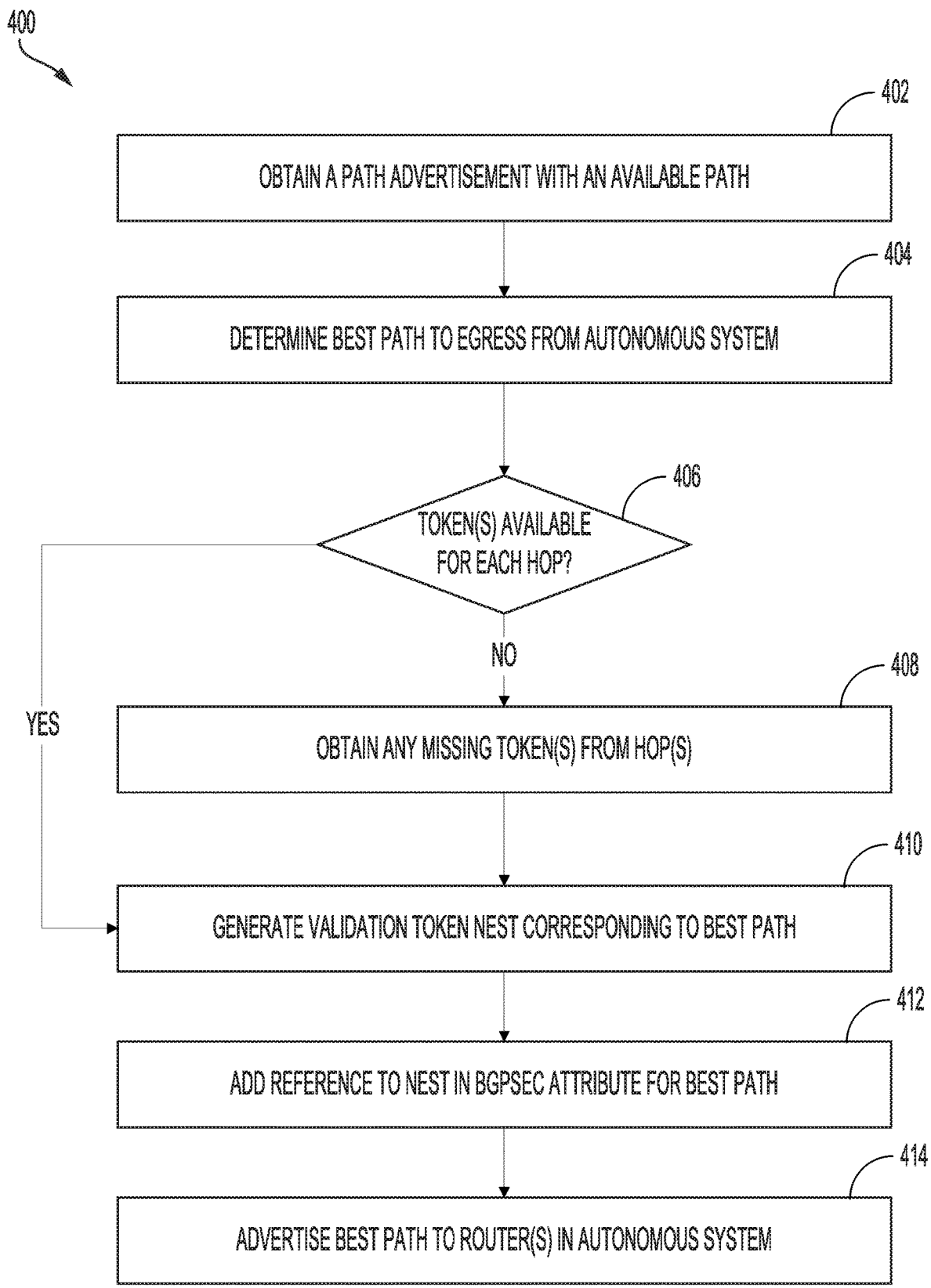
FIG. 4 shows an illustrative example of a process for generating a validation token nest corresponding to various hops for a best path within an autonomous system and inserting an attribute into a BGP update message corresponding to the nest in accordance with some implementations.

FIG. 4 shows an illustrative example of a process 400 for generating a validation token nest corresponding to various hops for a best path within an autonomous system and inserting an attribute into a BGP update message corresponding to the nest in accordance with some implementations. The process 400 may be performed by a route reflector within an AS, where the route reflector is configured to transmit BGP update messages to other network devices within the AS to advertise paths, including best paths, for the transmission of network traffic through the AS to an egress point.

In an embodiment, the route reflector obtains 402 a path advertisement with an available path for transmitting network traffic within the AS from an ingress point to an egress point. For instance, an edge router obtaining network traffic from another AS may transmit a BGP update message to the route reflector specifying an available path to route the network traffic to the egress point. In response to obtaining this BGP update message, the route reflector may determine 404 the best path to the egress point of the autonomous system. For instance, through the BGP-LS information garnered from various BGP speakers within the AS, the route reflector may obtain the forwarding tables of each network device within the AS. Using these forwarding tables, as well as the advertised path, the route reflector may determine the IGP cost for each possible path from ingress to egress within the AS. In some embodiments, the route reflector will select, as the best path, the path with the lowest IGP cost.

Upon identifying the best path from the ingress point to the egress point in the AS, the route reflector may determine 406 whether the validation tokens of the network devices through which network traffic is routed according to the best path are available. For instance, the route reflector may determine whether a validation token previously generated for a network device along the best path is fresh. If a particular validation token maintained by the route reflector is not fresh, the route reflector may determine that this validation token cannot be used to determine the current trustworthiness of the network device.

In some embodiments, in order to determine the best path to egress from the AS, the route reflector ensures that each network device to be used in routing traffic through the AS subject to the best path is trustworthy. For instance, the route reflector may identify any available validation tokens for these network devices and determine whether these validation tokens are fresh. If any of these validation tokens are not fresh, the route reflector may determine that evaluation of integrity data for these network devices is required in order to ensure that these network devices are trustworthy. Through this evaluation, the route reflector may select a best path that utilizes trustworthy network devices and has the lowest possible IGP cost.

In an embodiment, if the route reflector determines that one or more validation tokens need to be generated for the network devices to be used in routing traffic through the AS subject to the best path, the route reflector can obtain 408 these missing validation tokens. For instance, the route reflector may obtain, from one or more BGP speakers in the AS, BGP-LS information including TLVs corresponding to the forwarding tables of the network devices in the AS and sub-TLVs corresponding to the MACsec sessions established among the network devices in the AS. The route reflector may also transmit a request to each of these network devices to obtain the integrity data of these network devices. The route reflector may use the KGVs for these network devices to validate the integrity data and determine whether these network devices are trustworthy.

Using the BGP-LS information and the integrity data from these network devices, the route reflector may generate the validation tokens for each of these network devices. Each validation token includes a verifiable attestation that a network device is connected to the network device before it in the best path sequence and that the network device is also connected to the next hop network device after it in the best path sequence.

If the required validation tokens are available or have otherwise been generated by the route reflector using the BGP-LS information and integrity data of the network devices, the route reflector may generate 410 a validation token nest corresponding to the best path. As noted above, the validation token nest may be a merkle tree, whereby each of the validation tokens is nested in the merkle tree in accordance with the ordering of the network devices within the best path to be advertised via the BGP update message from the route reflector. However, other data structures may be used to generate the validation token nest in a manner that preserves the ordering of network devices and, thus, validation tokens for the best path.

In an embodiment, the route reflector adds 412 a reference to the validation token nest in a BGPsec attribute of the BGP update message for the best path. This reference may be used by a verifier to identify the validation token nest corresponding to the path advertised via the BGP update message. In some embodiments, the reference includes an identifier of the validation token nest. Additionally, the reference may include a network address or other information that may be used to access a storage location for the validation token nest and the corresponding validation tokens. Once the BGP update message has been generated by the route reflector, the route reflector may transmit the BGP update message to the network devices (e.g., routers) in the AS to advertise 414 the best path to these network devices.

Figure 5:
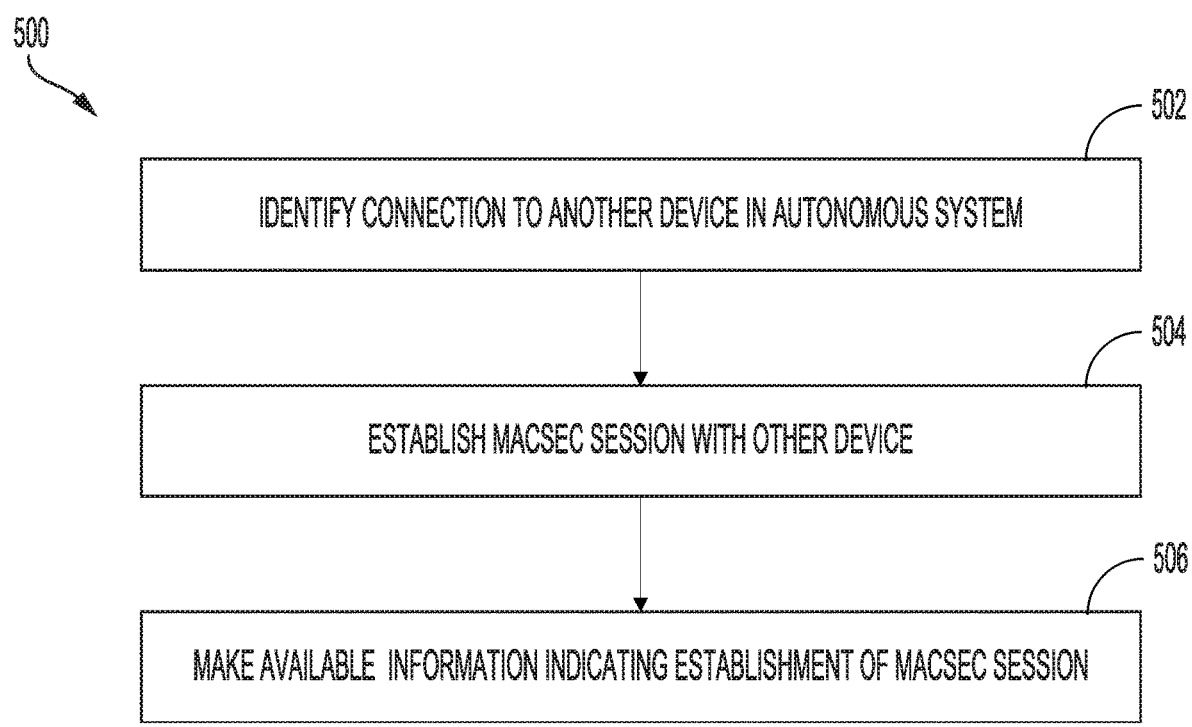
FIG. 5 shows an illustrative example of a process for establishing a MACsec session between a set of routers in an autonomous system in accordance with some implementations.

FIG. 5 shows an illustrative example of a process 500 for establishing a MACsec session between a set of routers in an autonomous system in accordance with some implementations. The process 500 may be performed by any router or network device within an AS that may act as an IGP neighbor to another router or other network device within the AS. In an embodiment, a network device identifies 502 a connection to another network device within the AS. These network devices may be IGP neighbors and may form an adjacency to exchange routing protocol packets. These network devices may utilize routing protocol packets to communicate in OSPF, ISIS, or any other applicable IGP.

As noted above, there may be intermediate devices connecting the network device to its IGP neighbor. For example, rather than a physical cable separating the network device and its IGP neighbor within the AS, one or more intermediate devices may provide connectivity between these IGP neighbors. To prevent security threats, such as passive wiretapping, intrusion, MitM attacks, playback attacks, and the like, the network device may establish 504 a MACsec session with the other network device. This MACsec session may prevent any of these intermediate devices from snooping or altering the network traffic between these IGP neighbors.

Once the MACsec session has been established, the network device may make 506 available information indicating establishment of the MACsec session. For instance, the network device may provide, using TLVs within BGP-LS information, its forwarding tables to the route reflector and information detailing the MACsec session with the other network device. Alternatively, the network device may advertise the MACsec session information to BGP speakers of the AS, which may obtain this information for transmission to the route reflector via the BGP-LS information.

Figure 6:
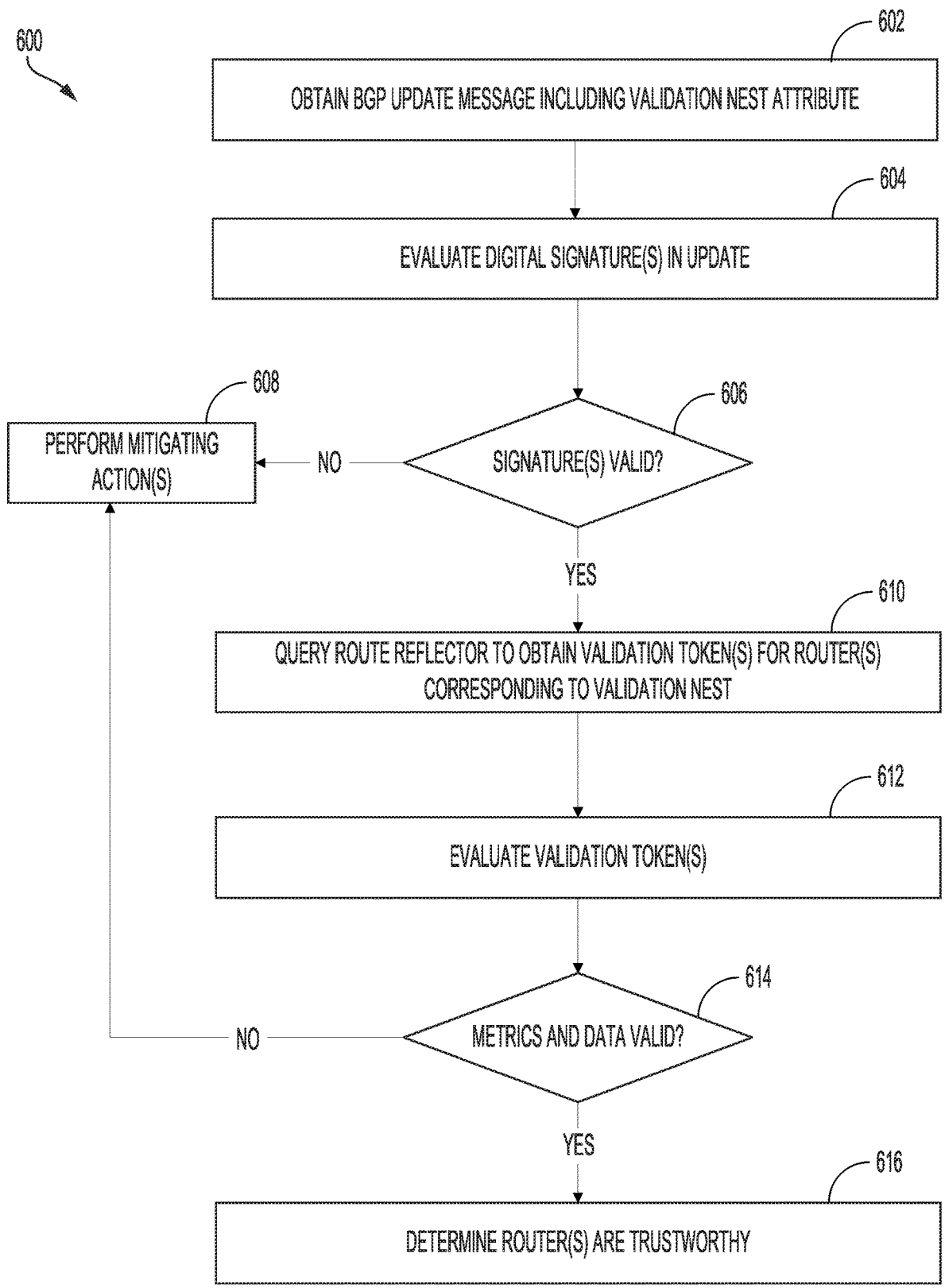
FIG. 6 shows an illustrative example of a process for determining the trustworthiness of a set of routers through which an update is propagated within an autonomous system in accordance with some implementations.

FIG. 6 shows an illustrative example of a process 600 for determining the trustworthiness of a set of routers through which an update is propagated within an autonomous system in accordance with some implementations. The process 600 may be performed by any verifier, which may include any network device along an advertised best path, an end node corresponding to the destination IP address for a BGP message update, and the like.

In an embodiment, a verifier obtains 602 a BGP update message from a route reflector. This BGP update message may include, within a BGPsec attribute, a reference to a validation token nest corresponding to the best path being advertised by the route reflector for routing network traffic from an ingress point to an egress point of the AS. The BGP update message may also include one or more digital signatures corresponding to each AS in the AS-path, which serve as attestations that the particular AS sent the route to the next AS in the AS-path.

In response to obtaining the BGP update message from the route reflector, the verifier may evaluate 604 the digital signatures corresponding to each AS in the AS-path indicated in the BGP update message to determine 606 whether these digital signatures are valid. If any of these digital signatures are not valid, the verifier may perform 608 one or more mitigating actions. For instance, the verifier may transmit a notification to an administrator of the network to indicate that a digital signature of a particular AS is not valid and, thus, its trustworthiness cannot be verified. This may cause the administrator to determine the source of this issue and to address the issue.

If these one or more digital signatures are valid, the verifier may query 610 the route reflector to obtain the one or more validation tokens of the network devices corresponding to the validation token nest referred to in the BGP update message. In an embodiment, the reference to the validation token nest includes an identifier of the validation token nest. Additionally, the reference may include a network address or other information that may be used to access a storage location for the validation token nest and the corresponding validation tokens. The validation token nest may be maintained by the route reflector in an internal validation token repository. However, in some instances, the validation token nest and corresponding validation tokens may be stored in a remote repository. Thus, rather than querying the route reflector, the verifier may use the network address specified in the reference to access the repository where the validation token nest may be stored and query this repository to obtain the validation token nest and corresponding validation tokens.

The verifier may evaluate 612 the validation tokens from the validation token nest to determine 614 whether the metrics and other integrity data that comprise these validation tokens are valid. For instance, the verifier may obtain the KGVs for each of the network devices along the best path and compare these to the metrics and other integrity data specified in the validation tokens. If the verifier determines, based on this evaluation, that a particular network device is not trustworthy, the verifier may perform 608 any mitigating actions described above. However, if the verifier determines that the metrics and other integrity data are valid (e.g., match the obtained KGVs, etc.), the verifier may determine 616 that the network devices along the best path are trustworthy. Further, this may indicate that network traffic has traversed the best path using trustworthy network devices, thereby preserving the security of the network traffic as it traverses through the AS.

FIG. 7 illustrates an example network device 700 suitable for performing switching, routing, and other networking operations in accordance with some implementations. Network device 700 includes a CPU 704, interfaces 702, and a connection 710 (e.g., a Peripheral Component Interconnect (PCI) bus). When acting under the control of appropriate software or firmware, the CPU 704 is responsible for executing packet management, error detection, and/or routing functions. The CPU 704 can accomplish these functions under the control of software including an operating system and any appropriate applications software. The CPU 704 may include one or more processors 708, such as a processor from the Intel® X98 family of microprocessors. In some cases, the processor 708 can be specially designed hardware for controlling the operations of network device 700. In some cases, a memory 706 (e.g., non-volatile RAM, ROM, etc.) also forms part of the CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM) interfaces, High-Speed Serial Interface (HSSI) interfaces, Packet Over SONET/SDH (POS) interfaces, Fiber Distributed Data Interface (FDDI) interfaces, WiFi interfaces, 3G/4G/5G cellular interfaces, Controller Area Network (CAN) bus, Long Range (LoRa), and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 704 to efficiently perform routing computations, network diagnostics, security functions, etc.

Although the system shown in FIG. 7 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC) 712, which can be configured to perform routing and/or switching operations. The ASIC 712 can communicate with other components in the network device 700 via the connection 710, to exchange data and signals and coordinate various types of operations by the network device 700, such as routing, switching, and/or data storage operations, for example.

FIG. 8 illustrates a computing system architecture 800 including various components in electrical communication with each other using a connection 806, such as a bus, in accordance with some implementations. Example system architecture 800 includes a processing unit (CPU or processor) 804 and a system connection 806 that couples various system components including the system memory 820, such as ROM 818 and RAM 816, to the processor 804. The system architecture 800 can include a cache 802 of high-speed memory connected directly with, in close proximity to, or integrated as part of the processor 804. The system architecture 800 can copy data from the memory 820 and/or the storage device 808 to the cache 802 for quick access by the processor 804. In this way, the cache can provide a performance boost that avoids processor 804 delays while waiting for data. These and other modules can control or be configured to control the processor 804 to perform various actions.

Other system memory 820 may be available for use as well. The memory 820 can include multiple different types of memory with different performance characteristics. The processor 804 can include any general purpose processor and a hardware or software service, such as service 1 810, service 2 812, and service 3 814 stored in storage device 808, configured to control the processor 804 as well as a special-purpose processor where software instructions are incorporated into the actual processor design. The processor 804 may be a completely self-contained computing system, containing multiple cores or processors, a bus, memory controller, cache, etc. A multi-core processor may be symmetric or asymmetric.

To enable user interaction with the computing system architecture 800, an input device 822 can represent any number of input mechanisms, such as a microphone for speech, a touch-sensitive screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system architecture 800. The communications interface 826 can generally govern and manage the user input and system output. There is no restriction on operating on any particular hardware arrangement and therefore the basic features here may easily be substituted for improved hardware or firmware arrangements as they are developed.

Storage device 808 is a non-volatile memory and can be a hard disk or other types of computer readable media which can store data that are accessible by a computer, such as magnetic cassettes, flash memory cards, solid state memory devices, digital versatile disks, cartridges, RAMs 816, ROM 818, and hybrids thereof.

The storage device 808 can include services 810, 812, 814 for controlling the processor 804. Other hardware or software modules are contemplated. The storage device 808 can be connected to the system connection 806. In one aspect, a hardware module that performs a particular function can include the software component stored in a computer-readable medium in connection with the necessary hardware components, such as the processor 804, connection 806, output device 824, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A computer-implemented method comprising:
    obtaining an advertised network path within an autonomous system, the advertised network path comprising a set of digital signatures corresponding to other autonomous systems corresponding to the advertised network path;
    identify a set of network paths to egress from the autonomous system;
    perform, using the set of network paths, a Shortest Path First (SPF) calculation to determine a set of costs;
    determining a second network path to egress from the autonomous system, the second network path corresponding to an ordering of network devices within the autonomous system and the second network path is selected from the set of network paths based on the set of costs;
    obtaining validation tokens of the network devices;
    generating, using the validation tokens and the ordering of network devices, a validation token nest;
    adding, as an attribute within the second network path, a reference to the validation token nest; and
    advertising the second network path to the network devices in the autonomous system.

2. The computer-implemented method of claim 1, wherein the validation tokens specify references to Media Access Control Security (MACsec) sessions among the network devices according to the ordering of the network devices.

3. The computer-implemented method of claim 1, wherein obtaining the validation tokens of the network devices comprises:
    obtaining Border Gateway Protocol Link-State (BGP-LS) information from one or more network devices within the autonomous system; and
    generating, using the BGP-LS information, the validation tokens of the network devices.

4. The computer-implemented method of claim 1, further comprising:
    receiving a request to obtain the validation tokens corresponding to the second network path, the request specifying an identifier of the validation token nest;
    identifying, based on the identifier, the validation tokens; and
    providing the validation tokens to fulfill the request.

5. The computer-implemented method of claim 1, wherein the second network path is advertised via a Border Gateway Protocol (BGP) update message.

6. The computer-implemented method of claim 1, wherein the reference is a digitally signed hash corresponding to the validation token nest.

7. A system, comprising:
    one or more processors; and
    memory including instructions that, as a result of being executed by the one or more processors, cause the system to:
        obtain a message specifying an advertised network path within an autonomous system;

identify a set of network paths to egress from the autonomous system;

perform, using the set of network paths, a Shortest Path First (SPF) calculation to determine a set of costs;

determine a second network path to egress from the autonomous system from the set of network paths based on the set of costs;

obtain a set of validation tokens corresponding to network devices of the autonomous system, the network devices being associated with the second network path;

generate, using the set of validation tokens based on an ordering of the network devices within the second network path, a validation token nest of the second network path;

add a reference to the second network path corresponding to the validation token nest; and advertise the second network path to the network devices of the autonomous system.

8. The system of claim 7, wherein the instructions further cause the system to:

obtain forwarding tables of the network devices, the forwarding tables including attestation information of the network devices; and utilize the attestation information to generate the set of validation tokens.

9. The system of claim 8, wherein the forwarding tables are obtained using BGP-LS, the BGP-LS including one or more Type Length Value (TLV) information elements corresponding to the attestation information.

10. The system of claim 8, wherein the attestation information specifies references to MACsec sessions among the network devices according to the ordering of the network devices.

11. The system of claim 7, wherein the instructions further cause the system to:

obtain a request to obtain the set of validation tokens, the request specifying an identifier of the validation token nest;

identify, based on the identifier of the validation token nest, a storage location of the set of validation tokens; and provide location information to allow access to the storage location to obtain the validation tokens.

12. The system of claim 7, wherein the instructions that cause the system to advertise the second network path to the network devices of the autonomous system further cause the system to transmit, to the network devices of the autonomous system, a BGP update message specifying the second network path.

13. A non-transitory computer-readable storage medium storing thereon executable instructions that, as a result of being executed by one or more processors of a computer system, cause the computer system to:

obtain an advertised network path within an autonomous system;

identify a set of network paths to egress from the autonomous system;

perform, using the set of network paths, a Shortest Path First (SPF) calculation to determine a set of costs;

identify a second network path to egress from the autonomous system, the second network path corresponding to an ordering of network devices within the autonomous system and the second network path is selected from the set of network paths based on the set of costs;

obtain a set of validation tokens of the network devices;

generate, using the set of validation tokens and based on the ordering of network devices, a validation token nest corresponding to the second network path; and transmit, to the network devices, the second network path, the second network path specifying an attribute corresponding to the validation token nest.

14. The non-transitory computer-readable storage medium of claim 13, wherein the executable instructions further cause the computer system to:

obtain, from the network devices, a set of forwarding tables, the set of forwarding tables including attestation information of the network devices; and use the attestation information to generate the set of validation tokens.

15. The non-transitory computer-readable storage medium of claim 13, wherein the attribute is a digitally signed hash that corresponds to the validation token nest and the second network path.

16. The non-transitory computer-readable storage medium of claim 15, wherein the set of validation tokens include evidence of a set of MACsec sessions among the network devices in accordance with the ordering.

17. The non-transitory computer-readable storage medium of claim 13, wherein the executable instructions further cause the computer system to:

obtain a request to obtain the validation tokens, the request specifying an identifier of the validation token nest;

identify, based on the identifier, a storage location of the validation tokens; and obtain the validation tokens from the storage location to provide the validation tokens in response to the request.

18. The non-transitory computer-readable storage medium of claim 13, wherein the second network path and the attribute are transmitted in a BGP update message to the network devices.

19. The non-transitory computer-readable storage medium of claim 13, wherein network devices utilize an Intermediate System-to-Intermediate System (ISIS) protocol within the autonomous system.

* * * * *